United States Patent [19]

Desmond et al.

[11] Patent Number: 4,634,686
[45] Date of Patent: Jan. 6, 1987

[54] YTTRIUM SILICATE MOLECULAR SIEVES

[75] Inventors: Michael J. Desmond, Cleveland Hts.; Frederick Pesa, Aurora; Reza Eshraghi, Sayamore Hills, all of Ohio

[73] Assignee: The Standard Oil Company, Cleveland, Ohio

[21] Appl. No.: 729,594

[22] Filed: May 2, 1985

[51] Int. Cl.$^4$ .............................................. B01J 29/04
[52] U.S. Cl. .................................. 502/60; 423/326; 423/328
[58] Field of Search ........................... 502/60, 61, 75; 423/326, 332, 329, 328 M, 328 C

[56] References Cited

U.S. PATENT DOCUMENTS 4,507,404  3/1985  Minderhoud et al. ............. 502/63 X
4,517,396  5/1985  Hoek et al. ....................... 585/418 X
4,543,347  9/1985  Heyward et al. ................... 502/61

FOREIGN PATENT DOCUMENTS 7817  1/1982  Japan .................................. 423/326

Primary Examiner—Carl F. Dees
Attorney, Agent, or Firm—Sue E. McKinney; Joseph G. Curatolo; Larry W. Evans

[57] ABSTRACT

A yttrium-silicate molecular sieve is disclosed which comprises a complex represented in terms of mole ratios of oxides as follows:

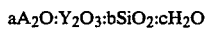

$$aA_2O:Y_2O_3:bSiO_2:cH_2O$$

wherein A is an alkali metal; a is a number ranging from about 0.5 to about 20; b is a number ranging from about 2 to about 400; and c is a number ranging from about 1 to about 500.

38 Claims, No Drawings

YTTRIUM SILICATE MOLECULAR SIEVES

TECHNICAL FIELD

This invention relates to molecular sieves and, more particularly, to yttrium silicate molecular sieves.

BACKGROUND OF THE INVENTION

The term "molecular sieve" refers to a wide variety of positive ion containing crystalline materials of both natural and synthetic varieties which exhibit the property of acting as sieves on a molecular scale. A major class of molecular sieves are crystalline aluminosilicates, although other crystalline materials are included in the broad definition. Examples of such other crystalline materials include coal, special active carbons, porous glass, microporous beryllium oxide powders, and layer silicates modified by exchange with organic cations. See, D. W. Breck, "Zeolite Molecular Sieves: Structure, Chemistry, and Use", John Wiley & Sons, 1974.

Zeolites are crystalline, hydrated, framework aluminosilicates which are based on a three-dimensional network of $AlO_4$ and $SiO_4$ tetrahedra linked to each other by sharing all of the oxygens. Zeolites may be represented by the empirical formula

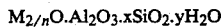

$$M_{2/n}O \cdot Al_2O_3 \cdot xSiO_2 \cdot yH_2O$$

wherein, x is generally equal to or greater than 2 since $AlO_4$ tetrahedra are joined only to $SiO_4$ tetrahedra, and n is the cation valence. The framework contains channels and interconnected voids which are occupied by the cation, M, and water molecules. The cations may be mobile and exchangeable to varying degrees by other cations. Intracrystalline zeolitic water in many zeolites is removed continuously and reversibly. In many other zeolites, mineral and synthetic, cation exchange or dehydration may produce structural changes in the framework. Ammonium and alkylammonium cations may be incorporated in synthetic zeolites, e.g., $NH_4$, $CH_3NH_3$, $(CH_3)_2NH_2$, $(CH_3)_3NH$, and $(CH_3)_4N$. In some synthetic zeolites, aluminum cations may be substituted by gallium ions and silicon ions by germanium or phosphorus ions. The latter necessitates a modification of the structural formula.

The structural formula of a zeolite is best expressed for the crystallographic unit cell as: $M_{x/n}[(AlO_2)_x(SiO_2)_y] \cdot wH_2O$ where M is the cation of valence n, w is the number of water molecules and the ratio y/x usually has values of 1-100 depending upon the structure. The sum (x+y) is the total number of tetrahedra in the unit cell. The complex within the [] represents the framework composition.

The zeolites described in the patent literature and published journals are designated by letters or other convenient symbols. Exemplary of these materials are Zeolite A (U.S. Pat. No. 2,882,243), Zeolite X (U.S. Pat. No. 2,882,244), Zeolite Y (U.S. Pat. No. 3,130,007), Zeolite ZSM-5 (U.S. Pat. No. 3,702,886), Zeolite ZSM-11 (U.S. Pat. No. 3,708,979), and Zeolite ZSM-12 (U.S. Pat. No. 3,832,449).

Although there are 34 species of zeolite minerals and about 100 types of synthetic zeolites, only a few have been found to have practical significance. Many of the zeolites, after dehydration, ae permeated by very small channel systems which are not interpenetrating and which may contain serious diffusion blocks. In other cases dehydration irreversibly disturbs the framework structure and the positions of metal cations, so that the structure partially collapses and dehydration is not completely reversible. To be efficiently used as a molecular sieve, the structure of the zeolite after complete dehydration must remain intact.

There has been considerable interest in developing metallosilicates other than aluminosilicates which exhibit molecular sieve characteristics. For example, U.S. Pat. Nos. 3,329,480 and 3,329,481 disclose crystalline zircano-silicates and titano-silicates, respectively. U.S. Pat. No. 3,329,384 discloses Group IV-B metallosilicates. U.S. Pat. Nos. 4,208,305, 4,238,315 and 4,337,176 disclose iron silicates. U.S. Pat. No. 4,329,328 discloses zinco-, stanno-, and titano-silicates. European patent application Nos. 0 038 682 and 0 044 740 disclose cobalt silicates. European Patent Application No. 0 050 525 discloses nickel silicate.

U.K. Patent Application No. GB 2,024,790 A discloses a silica-based material which has been modified with one or more elements which have entered the crystalline lattice of the silica in place of silicon atoms of the silica or in the form of salts of bisilicic or polysilicic acids. The elements identified as being suitable for making such silica-based materials are chromium, beryllium, titanium, vanadium, manganese, iron, cobalt, zinc, zirconium, rhodium, silver, tin, antimony and boron.

U.S. Pat. No. 4,299,808 discloses chromosilicates formed by reacting an aqueous mixture of an oxide of silicon, a compound of chromium, a hydroxide of an alkali or an alkaline earth metal, and an alkylammonium cation or a precursor of an alkylammonium cation.

U.S. Pat. Nos. 4,192,778 and 4,339,354 relate to a rare earth metal containing silicates. The former patent discloses rare earth exchanged zeolites of the faujasite type in which the equivalent of Na is less than 0.1 and the rare earth is at least 0.9 equivalents per gram atom of aluminum. The latter patent discloses a catalyst comprising a crystalline aluminosilicate such as zeolite Y, an inorganic matrix, and discrete particles of alumina, the catalyst having specified alkali metal and rare earth metal contents.

U.S. Pat. No. 3,769,386 discloses zeolitic aluminometallosilicates crystallized from an aqueous reaction mixture containing $Na_2O$, $SiO_2$, $Al_2O_3$ and $R_{2/n}$ wherein R is Mg, Ca, Y, Fe, Co, Ni or a rare earth metal and n is the valence of R.

There remains a need for suitable metallosilicates that exhibit molecular sieve character, are stable at temperatures in excess of about 400° C., have relatively uniform pore sizes and are capable of desorbing an adsorbed phase without significant change in crystal structure. There is also a need for a relatively simplified method for making such metallosilicates.

SUMMARY OF THE INVENTION

The present invention relates to yttrium silicates which exhibit molecular sieve character, are stable at temperatures in excess of about 400° C., have relatively uniform pore sizes, and are capable of desorbing an adsorbed phase without significant change in crystal structure. The invention also relates to a relatively simplified method for making such yttrium silicates.

Broadly stated, the present invention contemplates the provision of a molecular sieve comprising a complex represented in terms of mole ratios of oxides as follows:

$aA_2O:Y_2O_3:bSiO_2:cH_2O$ wherein

A is an alkali metal;
a is a number ranging from about 0.5 to about 20;
b is a number ranging from about 2 to about 400; and
c is a number ranging from about 1 to about 500.

The invention further provides for a method for preparing a molecular sieving yttrium silicate comprising maintaining a mixture of a source of silicon, a source of yttrium, a source of alkali metal and water at a temperature in the range of about 50° C. to about 350° C. for an effective period of time to provide said yttrium silicate.

DETAILED DESCRIPTION OF THE PREFERRED EMBODIMENTS

The molecular sieving yttrium silicates provided in accordance with the invention are complexes represented in terms of mole ratios of oxides by the formula $aA_2O:Y_2O_3:bSiO_2:cH_2O$ wherein A is an alkali metal, preferably sodium,
a is a number ranging from about 0.5 to about 20, preferably from about 0.8 to about 10;
b is a number ranging from about 2 to about 400, preferably from about 3 to about 200; and
c is a number ranging from about 1 to about 500, preferably from about 1 to about 200.

These yttrium silicates exhibit two different general structures. One of the structures exhibits the following significant distinguishing lines among the reflections in the x-ray diffraction pattern, and is a preferred material formed when the Si/Y ratio is less than about six in the recovered solid.

TABLE I

| Interplanar Spacing d(A) | Relative Intensity |
|---|---|
| 11.30 ± 0.40 | s |
| 6.22 ± 0.15 | s |
| 5.54 ± 0.15 | w-m |
| 3.55 ± 0.08 | w |
| 3.09 ± 0.06 | s |
| 2.99 ± 0.05 | s |
| 2.83 ± 0.04 | w |
| 2.76 ± 0.03 | w-m |
| 2.41 ± 0.03 | w |
| 2.22 ± 0.03 | w |
| 2.17 ± 0.02 | w |
| 2.01 ± 0.02 | w |

The other structure generally forms when the Si/Y ratio in the recovered solid is greater than about six. This material exhibits at least the following distinguishing lines among the reflections in its x-ray diffraction pattern:

TABLE II

| Interplanar Spacing d(A) | Relative Intensity |
|---|---|
| 12.30 ± 0.50 | m |
| 7.06 ± 0.15 | vs |
| 6.57 ± 0.15 | m |
| 6.08 ± 0.15 | w |
| 5.83 ± 0.10 | w |
| 4.80 ± 0.10 | m |
| 4.48 ± 0.08 | m |
| 3.74 ± 0.08 | w |
| 3.48 ± 0.06 | w |
| 3.09 ± 0.05 | m |
| 2.99 ± 0.05 | m-s |
| 2.90 ± 0.04 | w-m |
| 2.73 ± 0.04 | m |
| 2.16 ± 0.03 | w |

These general patterns of significant x-ray reflections can also be attributed to the calcined and ion exchange forms of the yttrium silicates, although minor line shifts usually occur in the materials when these processes are performed.

The values were determined by standard techniques. The relative intensities are given in terms of symbols: vs=very strong; s=strong; m=medium; w=weak; and vw=very weak.

All x-ray patterns are obtained using standard x-ray powder diffraction techniques. The radiation source is a standard intensity, copper target, x-ray tube operated at 40 Kv and 20 ma. The diffraction pattern from the K alpha radiation is suitably recorded by an x-ray spectrometer scintillation counter, plus height analyzer and strip chart recorder. Flat compressed powder samples are scanned at 1° per minute, using a two second time constant. Interplanar spacings (d) are obtained from the position if the diffraction peaks expressed as $2\theta$ where $\theta$ is the Bragg angle as observed on the strip chart. Intensities are determined from the heights of diffraction peaks after subtracting background.

As will be understood by those skilled in the art, the determination of the parameter $2\theta$, irrespective of the technique employed, is subject to both human and mechanical error, which in combination, can improve an uncertainty of about 0.4° on each reported value of $2\theta$. This uncertainty is, of course, also manifested in the reported values of the d-spacings, which are calculated from the $2\theta$ values. This impression is general throughout the art and is not sufficient to preclude the differentiation of the present crystalline materials from each other and from the compositions of the prior art.

In a preferred embodiment of the invention, the mixture provided for in the process of the invention for making the yttrium silicates is preferably prepared in three steps. First, the silicon source is mixed in water to provide a first mixture. This first mixture is preferably in the form of a colloidal dispersion. Second, the yttrium source is mixed with water to provide a second mixture. This second mixture is usually in the form of a dispersion or solution. Third, these first and second mixtures are mixed together to form a gel. The source of alkali metal is added to the gel with stirring. The Si to yttrium mole ratio is preferably in the range of about 1 to about 200, more preferably about 2 to about 30. The OH— to Y mole ratio is preferably in the range of about 1 to about 25. The H₂O to Y mole ratio is preferably in the range of about 50 to about 2500. The alkali metal to Y mole ratio is preferably in the range of about 1 to about 25, more preferably about 3 to about 20.

The silicon source can be any source that provides silicon oxide, hydroxide or alkoxide. Such sources include silica gel, silicic acid, silica sol and the silicates. Included within the silicates are the alkali and alkaline earth metal silicates with sodium silicate and potassium silicate being preferred. The alkoxides include those alkoxides of up to about 10, preferably up to about 6 carbon atoms. The silica sols are aqueous colloidal dispersions containing colloidal silica particles. The solids content of these colloidal dispersions generally ranges up to about 70% by weight, and is preferably in the range of about 5% to about 50%. These dispersions usually include an effective amount of an anionic (e.g., acetate, halogen, etc.) or cationic (e.g., alkali metal, ammonium, etc.) stabilizing agent to stabilize the dispersion. Generally the level of addition of such stabilizing agents is up to about 10% by weight of the solids in the dispersion. A commercially available silica sol that is particularly useful is Ludox AS-30 which is a product of DuPont identified as an ammonium stabilized silica sol containing 30% by weight silica.

The yttrium source can be any compound that provides trivalent yttrium. These compounds include oxides, hydroxides, inorganic salts (e.g., nitrates, sulfates, halides, carbonates, silicates, and the like) as well as the organic salts, (e.g., acetates, formates, butyrates, propionates, benzylates and the like). Yttrium chloride, yttrium chloride hydrate, and yttrium oxide are preferred.

The alkali metal source can be any metal compound that provides the desired alkali metal cation. These compounds include the oxides, hydroxides, inorganic salts (e.g., nitrates, halides, sulfates, carbonates, silicates, and the like) as well as the organic salts, (e.g., acetates, formates, butyrates, propionates, benzylates and the like). Sodium hydroxide is preferred.

In the method of the present invention for making the yttrium silicates, the mixture containing water, the source of silicon, the yttrium source, and the alkali metal source is preferably thoroughly mixed and then placed in a reactor. The reactor is preferably an enclosed reactor (e.g., a static bomb style reactor). The contents are heated to a temperature in the range of preferably about 50° C. to about 350° C., more preferably about 100° C. to about 200° C., under autogeneous pressure for an effective period of time to provide the desired molecular sieving yttrium silicate, preferably for about one hour to about 30 days, more preferably about 6 hours to about 14 days. The contents of the reactor are then allowed to cool to room temperature. The crystalline solids are separated from the mother liquor and washed thoroughly with water. Separation can be effected by conventional filtration techniques. The crystalline solids are then allowed to dry in air, such solids being the desired molecular sieving yttrium silicates of the invention.

The yttrium silicates of the invention can be ion exchanged with an ammonium salt or a salt of a catalytically active metal. The salt of the catalytically active metal is preferably the salt of a Group VIII, IB or IIB metal, with zinc, copper, nickel, cobalt and iron being preferred. The anionic portions of these salts include the nitrates, phosphates, sulfates, acetates and halides. The cation exchange procedure employed herein is entirely conventional. Briefly, the yttrium silicate and the ammonium salt or salt of catalytically active metal are dispersed in water for an effective period of time and at a sufficient temperature to provide the desired ion-exchanged yttrium silicate. Preferably the yttrium silicate and the salt are so dispersed for a few minutes to several hours, preferably about one to about ten hours, and maintained at about room temperature to about the boiling point of the water. The ion-exchanged yttrium silicate is then filtered and washed.

Optionally, the ion-exchanged yttrium silicates can be heat treated in an inert, oxidizing or reducing atmosphere using the following heat treating procedures to convert the ion-exchanged species to a more active form. The heat treating procedure is conducted at a temperature of about 200° C. to about 900° C., preferably about 300° C. to about 600° C. The time period for this heat treating step is dependent upon the mass of material being treated. Preferably the heat treating step is conducted for at least about 30 minutes, but this time period can be more or less than 30 minutes depending upon the mass of material being treated. The inert atmosphere is preferably nitrogen, argon, helium or neon. The reducing atmosphere is hydrogen or a mixture of hydrogen and one of the above-indicated insert gases. The reducing atmosphere can contain from about 1% to about 100% hydrogen, preferably about 1% to about 20% hydrogen, with the remainder being inert gas. The oxidizing atmosphere can be oxygen or a mixture of oxygen and one of the above-indicated inert gases. The oxidizing atmosphere can contain from about 1% to about 100% oxygen, preferably from about 1% to about 20% oxygen with the remainder being inert as. A preferred oxidizing atmosphere is air.

In order to further illustrate the present invention, the following examples are provided. Unless otherwise indicated, in the following examples as well as throughout the specification and in the claims, all parts and percentages are by weight, and all temperatures are in degrees centigrade.

EXAMPLE 1

0.985 grams of yttrium chloride hydrate were dissolved in 2 grams of water. This solution was mixed with 1.3 grams of Ludox AS-30 and stirred. 1.5 grams of a 50% sodium hydroxide solution diluted in 2 grams of water were added to the mixture. The mixture was stirred until a uniform gel was formed. The Si/Y mole ratio was about 2. The Na/Y mole ratio was about 5.9. The H$_2$O/Y mole ratio was about 70. The mixture was charged to a Teflon lined static bomb reactor. The reactor was placed in an oven at 170° C. for 12 days. The reactor was removed from the oven and cooled. The product was removed from the reactor, filtered, washed with distilled water and dried. Elemental analysis and the determination of the loss on ignition (LOI) to 1000° C. for the recovered solid resulted in the following formulation on an oxide basis:

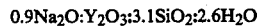

0.9Na$_2$O:Y$_2$O$_3$:3.1SiO$_2$:2.6H$_2$O

The x-ray diffraction pattern of this dried product exhibited the following significant lines (Cu K alpha radiation) (w=weak, m=medium, s=strong):

| Interplanar Spacing d(A) | Relative Intensity |
|---|---|
| 11.42 | s |
| 9.56 | w |
| 6.22 | m |
| 5.82 | w |
| 5.64 | w |
| 4.79 | w |
| 3.76 | w |
| 3.55 | w |
| 3.09 | s |
| 3.08 | s |
| 2.99 | s |
| 2.88 | w |
| 2.82 | m |
| 2.76 | w |
| 2.69 | w |

| Interplanar Spacing d(A) | Relative Intensity |
|---|---|
| 2.41 | w |
| 2.26 | w |
| 2.22 | w |
| 2.06 | w |
| 2.01 | w |

EXAMPLE 2

0.492 grams of yttrium chloride hydrate were dissolved in 2 grams of water. This solution was mixed with 1.3 grams of Ludox AS-30 and stirred. 1.5 grams of a 50% sodium hydroxide solution diluted in 2 grams of water were added to the mixture. The mixture was stirred until a uniform gel was formed. The Si/Y mole ratio was about 4. The Na/Y mole ratio was about 11.6. The $H_2O/Y$ mole ratio was about 132. The mixture was charged to a Teflon lined static bomb reactor. The reactor was placed in an oven at 170° C. for 12 days. The reactor was removed from the oven and cooled. The product was removed from the reactor, filtered, washed with distilled water and dried. Elemental analysis and the determination of the LOI to 1000° C. for the recovered solid resulted in the following formulation on an oxide basis:

$1.4Na_2O:Y_2O_3:4.7SiO_2:3.6H_2O$

The x-ray diffraction pattern of this dried product exhibited the following significant lines (Cu K alpha radiation) (w=weak, m=medium, s=strong, vs=very strong):

| Interplanar Spacing d(A) | Relative Intensity |
|---|---|
| 11.34 | vs |
| 6.20 | s |
| 5.54 | w |
| 4.80 | w |
| 3.52 | w |
| 3.09 | s |
| 2.99 | s |
| 2.84 | m |
| 2.76 | m |
| 2.41 | w |
| 2.23 | w |
| 2.16 | w |
| 2.06 | w |
| 2.01 | w |

EXAMPLE 3

9.75 grams of yttrium chloride hydrate were dissolved in 450 grams of water to provide a first mixture. 97.5 grams of Ludox AS-30 were diluted with 525 grams of water to provide a second mixture. The first and second mixtures were mixed together and stirred. 45 grams of a 50% sodium hydroxide solution diluted in 225 grams of water were added to the mixture. The mixture was stirred until a uniform gel was formed. The Si/Y mole ratio was about 15.2. The Na/Y mole ratio was about 17.5. The $H_2O/Y$ mole ratio was about 2050. The mixture was charged to a Teflon lined static bomb reactor. The reactor was placed in an oven at 170° C. for 4 days. The reactor was removed from the oven and cooled. The product was removed from the reactor, filtered, washed with distilled water and dried. Elemental analysis and the determination of the LOI to 1000° C. for the recovered solid resulted in the following formulation on an oxide basis:

$2.7Na_2O:Y_2O_3:14.8SiO_2:10.1H_2O$

The x-ray diffraction pattern of this dried product exhibited the following significant lines (Cu K alpha radiation) (w=weak, m=medium, s=strong, vs=very strong):

| Interplanar Spacing d(A) | Relative Intensity |
|---|---|
| 12.38 | m |
| 7.07 | vs |
| 6.60 | m |
| 6.08 | w |
| 5.83 | w |
| 4.80 | m |
| 4.48 | m |
| 3.74 | w |
| 3.50 | w |
| 3.40 | m |
| 3.10 | m |
| 3.00 | m |
| 2.90 | w |
| 2.74 | m |
| 2.64 | w |
| 2.56 | w |
| 2.34 | w |
| 2.15 | w |

EXAMPLE 4

0.492 grams of yttrium chloride hydrate were dissolved in one gram of water. This solution was mixed with 1.3 grams of Ludox AS-30 and stirred. One gram of a 50% sodium hydroxide solution diluted in one gram of water was added to the mixture. The mixture was stirred until a uniform gel was formed. The Si/Y mole ratio was about 4. The Na/Y mole ratio was about 7.7. The $H_2O/Y$ mole ratio was about 65. The mixture was charged to a Teflon lined static bomb reactor. The reactor was placed in an oven at 170° C. for 4 days. The reactor was removed from the oven and cooled. The product was removed from the reactor, filtered, washed with distilled water and dried. The x-ray diffraction pattern of this dried product exhibited the following significant lines (Cu K alpha radiation ) (w=weak, m=medium, s=strong, vs=very strong):

| Interplanar Spacing d(A) | Relative Intensity |
|---|---|
| 11.40 | s |
| 9.64 | w |
| 6.19 | m |
| 5.63 | w |
| 3.58 | m |
| 3.09 | s |
| 3.08 | s |
| 2.98 | s |
| 2.88 | s |
| 2.83 | m |
| 2.75 | m |
| 2.68 | w |
| 2.41 | w |
| 2.27 | w |
| 2.22 | w |
| 2.18 | w |
| 2.10 | w |
| 2.02 | w |

EXAMPLE 5

0.06 grams of yttrium chloride hydrate were dissolved in 3.75 grams of water. This solution was mixted with 3.9 grams of Ludox AS-30 and stirred. 1.5 grams of a 50% sodium hydroxide solution diluted in 3.75 grams of water were added to the mixture. The mixture was stirred until a uniform gel was formed. The Si/Y mole ratio was about 98. The Na/Y mole ratio was about 95. The $H_2O$/Y mole ratio was about 2100. The mixture was charged to a Teflon lined static bomb reactor. The reactor was placed in an oven at 170° C. for 5 days. The reactor was removed from the oven and cooled. The product was removed from the reactor, filtered, washed with distilled water and dried. The x-ray diffraction pattern of this dired product exhibited the following significant lines (Cu K alpha radiation) (w=weak, m=medium, s=strong, vs=very strong):

| Interplanar Spacing d(A) | Relative Intensity |
| --- | --- |
| 12.60 | m |
| 7.01 | s |
| 6.57 | m |
| 5.85 | w |
| 5.63 | w |
| 4.77 | w |
| 4.48 | w |
| 3.69 | w |
| 3.46 | w |
| 3.09 | w |
| 2.98 | s |
| 2.73 | w |
| 2.15 | w |

EXAMPLE 6

Ion-exchanged yttrium silicates were prepared by placing 0.5 gram of the product of Example 3 in each of three flasks containing 20 ml of 0.1M solutions of $NH_4Cl$, KCl, and $CaCl_2$, respectively. The mixtures were stirred for 24 hours. The solids were recovered by filtration and washed with distilled water and dried. The ion exchange, filter, recover and wash sequence was repeated two additional times for each of the samples. The recovered $NH_4+$ exchanged material was analyzed for N, Na, Y, and Si, and is represented by the following formula on an anhydrous, oxide basis:

$$2.0(NH_4)_2O:0.7Na_2O:Y_2O_3:14.8SiO_2$$

The recovered K+ exchanged material was analyzed for K, Na, Y, and Si, and is represented by the following formula on an anyhdrous, oxide basis:

$$1.2K_2O:1.5Na_2O:Y_2O_3:14.8SiO_2$$

The recovered $Ca^{2+}$ exchanged material was analyzed for Ca, Na, Y, and Si, and is represented by the following formula on an anhydrous basis:

$$2.6CaO:0.1Na_2O:Y_2O_3:14.8SiO_2$$

EXAMPLE 7

One gram of the product of Example 1 was placed in 25 ml of a 0.1M $CaCl_2$ solution and stirred for 24 hours. The solid was recovered by filtration, washed thoroughly with distilled water and dried. The x-ray diffraction pattern of this dried product exhibited the following significant lines (Cu K alpha radiation) (w=weak, m=medium, s=strong, vs=very strong):

| Interplanar Spacing d(A) | Relative Intensity |
| --- | --- |
| 11.12 | vs |
| 9.41 | m |
| 6.17 | w |
| 5.43 | m |
| 4.79 | w |
| 3.67 | w |
| 3.48 | m |
| 3.08 | s |
| 3.04 | s |
| 2.97 | s |
| 2.76 | m |
| 2.40 | w |
| 2.22 | m |
| 2.09 | w |
| 1.99 | w |

EXAMPLE 8

One gram of the product of Example 3 was placed in 25 ml of a 0.1M $CaCl_2$ solution and stirred for 24 hours. The solid was recovered by filtration, washed thoroughly with distilled water and dried. The x-ray diffraction pattern of this dried product exhibited the following significant lines (Cu K alpha radiation) (w=weak, m=medium, s=strong, vs=very strong):

| Interplanar Spacing d(A) | Relative Intensity |
| --- | --- |
| 12.18 | s |
| 7.03 | vs |
| 6.55 | s |
| 5.98 | w |
| 5.76 | w |
| 4.78 | m |
| 4.44 | m |
| 3.72 | w |
| 3.50 | m |
| 3.39 | m |
| 3.09 | s |
| 2.99 | s |
| 2.96 | s |
| 2.89 | m |
| 2.74 | m |
| 2.63 | w |
| 2.54 | w |
| 2.15 | w |

EXAMPLE 9

One gram of the product of Example 4 was placed in 25 ml of a 0.1M $CaCl_2$ solution and stirred for 24 hours. The solid was recovered by filtration, washed thoroughly with distilled water and dried. The x-ray diffraction pattern of this dried product exhibited the following significant lines (Cu K alpha radiation) (w=weak, m=medium, s=strong, vs=very strong):

| Interplanar Spacing d(A) | Relative Intensity |
| --- | --- |
| 11.46 | s |
| 6.20 | m |
| 5.48 | m |
| 3.87 | w |
| 3.66 | w |
| 3.48 | w |
| 3.09 | s |
| 3.06 | s |

-continued

| Interplanar Spacing d(A) | Relative Intensity |
|---|---|
| 2.99 | s |
| 2.80 | m |
| 2.74 | m |
| 2.51 | w |
| 2.41 | w |
| 2.29 | w |
| 2.14 | w |
| 2.10 | w |
| 2.00 | w |

EXAMPLE 10

0.100 gram of the solid prepared in Example 1 was placed in the quartz pan of McBain-Bakr balance. The system was evacuated ($10^{-5}$ torr) and the sample chamber was heated for 18 hours at 200° C. to remove adsorbed species from the sample. Adsorption studies with both oxygen and n-hexane to determine adsorption properties of the molecular sieve were conducted. Representative data from these experiments appears in the following table:

| | Pressure (torr) | Kinetic Diameters (A) | Temperature °C. | Weight % Adsorbed |
|---|---|---|---|---|
| Oxygen | 19.7 | 3.46 | −196 | 0.5 |
| Oxygen | 96.6 | 3.46 | −196 | 1.4 |
| n-hexane | 46 | 4.3 | 23 | 1.2 |

EXAMPLE 11

0.100 gram of the solid prepared in Example 7 was placed in the quartz pan of a McBain-Bakr balance. The system was then evacuated ($10^{-5}$ torr) and the sample chamber was heated for 18 hours at 200° C. to remove adsorbed species from the sample. Adsorption studies with both oxygen and n-hexane to determine adsorption properties of the molecular sieve were conducted. Representative data from these experiments appears in the following table:

| | Pressure (torr) | Kinetic Diameters (A) | Temperature °C. | Weight % Adsorbed |
|---|---|---|---|---|
| Oxygen | 13 | 3.46 | −196 | 0.87 |
| Oxygen | 97 | 3.46 | −196 | 1.37 |
| n-hexane | 50.6 | 4.3 | 23 | 0.2 |

EXAMPLE 12

0.100 gram of the solid prepared in Example 7 was placed in the quartz pan of a McBain-Bakr balance. The system was then evacuated ($10^{-5}$ torr) and the sample chamber was heated for 18 hours at 200° C. to remove adsorbed species from the sample. Adsorption studies with both oxygen and n-hexane to determine adsorption properties of the molecular sieve were conducted. Representative data from these experiments appears in the following table:

| | Pressure (torr) | Kinetic Diameters (A) | Temperature °C. | Weight % Adsorbed |
|---|---|---|---|---|
| Oxygen | 19.7 | 3.46 | −196 | 1.17 |
| Oxygen | 96.6 | 3.46 | −196 | 2.6 |
| n-hexane | 46 | 4.3 | 24 | 1.86 |

EXAMPLE 13

0.100 gram of the solid prepared in Example 9 was placed in the quartz pan of a McBain-Bakr balance. The system was then evacuated ($10^{-5}$ torr) and the sample chamber was heated for 18 hours at 200° C. to remove adsorbed species from the sample. Adsorption studies with both oxygen and n-hexane to determine adsorption properties of the molecular sieve were conducted. Representative data from these experiments appears in the following table:

| | Pressure (torr) | Kinetic Diameters (A) | Temperature °C. | Weight % Adsorbed |
|---|---|---|---|---|
| Oxygen | 13 | 3.46 | −196 | 3.65 |
| Oxygen | 97 | 3.46 | −196 | 7.0 |
| n-hexane | 28.3 | 4.3 | 24 | 2.6 |
| n-hexane | 50.6 | 4.3 | 24 | 4.0 |

EXAMPLE 14

0.100 gram of the solid prepared in Example 8 was placed in the quartz pan of a McBain-Bakr balance. The system was then evacuated ($10^{-5}$ torr) and the sample chamber was heated for 18 hours at 200° C. to remove adsorbed species from the sample. Adsorption studies with both oxygen and the n-hexane to determine adsorption properties of the molecular sieve were conducted. Representative data from these experiments appears in the following table:

| | Pressure (torr) | Kinetic Diameters (A) | Temperature °C. | Weight % Adsorbed |
|---|---|---|---|---|
| Oxygen | 13 | 3.46 | −196 | 0.87 |
| Oxygen | 97 | 3.46 | −196 | 1.37 |
| n-hexane | 50.6 | 4.3 | 23 | 0.2 |

EXAMPLE 15

0.5 gram of the product prepared in Example 8 was placed in a porcelain crucible and heated to 400° C. in air and maintained at that temperature for four hours to provide a calcined product. The crucible was cooled and the product recovered. The x-ray diffraction pattern of this calcined product exhibited the following significant lines (Cu K alpha radiation) (w=weak, m=medium, s=strong, vs=very strong):

| Interplanar Spacing d(A) | Relative Intensity |
|---|---|
| 12.10 | s |
| 7.02 | s |
| 6.56 | s |
| 6.01 | m |
| 5.79 | m |
| 4.78 | w |
| 4.45 | m |
| 3.72 | w |
| 3.49 | m |
| 3.38 | m |
| 3.16 | w |
| 3.09 | m |

| Interplanar Spacing d(A) | Relative Intensity |
|---|---|
| 2.99 | s |
| 2.88 | m |
| 2.74 | m |
| 2.63 | w |
| 2.54 | w |
| 2.15 | w |

EXAMPLE 16

0.5 gram of the product prepared in Example 2 was placed in a porcelain crucible and heated to 400° C. in air and maintained at that temperature for four hours to provide a calcined product. The crucible was cooled and the product recovered. The x-ray diffraction pattern of this calcined product exhibited the following significant lines (Cu K alpha radiation) (w=weak, m=medium, s=strong, vs=very strong):

| Interplanar Spacing d(A) | Relative Intensity |
|---|---|
| 11.21 | s |
| 9.35 | w |
| 6.19 | m |
| 5.59 | w |
| 3.56 | m |
| 3.08 | s |
| 3.06 | s |
| 2.99 | s |
| 2.86 | m |
| 2.81 | m |
| 2.74 | w |
| 2.69 | w |
| 2.40 | w |
| 2.27 | w |
| 2.22 | w |
| 2.16 | w |
| 2.08 | w |
| 2.01 | w |

EXAMPLE 17

0.5 gram of the product prepared in Example 3 was placed in a porcelain crucible and heated to 400° C. in air and maintained at that temperature for four hours to provide a calcined product. The crucible was cooled and the product recovered. The x-ray diffraction pattern of this calcined product exhibited the following significant lines (Cu K alpha radiation) (w=weak, m=medium, s=strong, vs=very strong):

| Interplanar Spacing d(A) | Relative Intensity |
|---|---|
| 12.03 | m |
| 6.98 | s |
| 6.53 | s |
| 6.01 | w |
| 5.79 | m |
| 4.77 | w |
| 4.46 | m |
| 3.70 | m |
| 3.48 | m |
| 3.38 | m |
| 3.16 | w |
| 3.09 | m |
| 2.98 | s |
| 2.89 | m |
| 2.84 | w |
| 2.73 | m |
| 2.63 | w |
| 2.56 | w |
| 2.16 | w |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A molecular sieve comprising a complex represented in terms of mole ratios of oxides as follows:

$$aA_2O:Y_2O_3:bSiO_2:cH_2O$$

wherein
A is an alkali metal;
a is a number ranging from about 0.5 to about 20;
b is a number ranging from about 2 to about 400; and
c is a number ranging from about 1 to about 500.

2. The molecular sieve of claim 1 wherein the Si/Y ratio is less than about six, said complex showing at least the following significant x-ray diffraction lines:

| Interplanar Spacing d(A) | Relative Intensity |
|---|---|
| 11.30 ± 0.40 | s |
| 6.22 ± 0.15 | s |
| 5.54 ± 0.15 | w-m |
| 3.55 ± 0.08 | w |
| 3.09 ± 0.06 | s |
| 2.99 ± 0.05 | s |
| 2.83 ± 0.04 | w |
| 2.76 ± 0.03 | w-m |
| 2.41 ± 0.03 | w |
| 2.22 ± 0.03 | w |
| 2.17 ± 0.02 | w |
| 2.01 ± 0.02 | w |

3. The molecular sieve of claim 1 wherein the Si/Y ratio is greater than about six, said complex showing at least the following significant x-ray diffraction lines:

| Interplanar Spacing d(A) | Relative Intensity |
|---|---|
| 12.30 ± 0.50 | m |
| 7.06 ± 0.15 | vs |
| 6.57 ± 0.15 | m |
| 6.08 ± 0.15 | w |
| 5.83 ± 0.10 | w |
| 4.80 ± 0.10 | m |
| 4.48 ± 0.08 | m |
| 3.74 ± 0.08 | w |
| 3.48 ± 0.06 | w |
| 3.09 ± 0.05 | m |
| 2.99 ± 0.05 | m-s |
| 2.90 ± 0.04 | w-m |
| 2.73 ± 0.04 | m |
| 2.16 ± 0.03 | w |

4. The molecular sieve of claim 1 wherein a is in the range of from about 0.8 to about 10.

5. The molecular sieve of claim 1 wherein b is in the range of from about 3 to about 200.

6. The molecular sieve of claim 1 wherein c is in the range of from about 1 to about 200.

7. The molecular sieve of claim 1 wherein A is sodium.

8. The molecular sieve of claim 1 wherein Y is trivalent.

9. A method for preparing a molecular sieving yttrium silicate comprising maintaining a mixture of a source of silicon, a source of yttrium, a source of alkali metal and water at a temperature in the range of about 50° C. to about 350° C. for an effective period of time to provide said yttrium silicate, wherein said mixture has a mole ratio of silicon to yttrium in the range of about 1:1 to about 200:1, a mole ratio of $H_2O$ to Y in the range of about 50:1 to about 2500:1, and a mole ratio of alkali metal to yttrium in the range of about 1:1 to about 25:1.

10. The method of claim 9 with the step of separating said yttrium silicate from its mother liquor.

11. The method of claim 9 with the step of washing said yttrium silicate.

12. The method of claim 9 with the step of ion exchanging said yttrium silicate with an ammonium salt or the salt of a catalytically active metal to provide an ion exchanged yttrium silicate.

13. The method of claim 12 with the step of heat treating said ion exchanged yttrium silicate in an inert, oxidizing or reducing atmosphere.

14. The method of claim 9 wherein a hydroxide compound is the source of silicon, yttrium or alkali metal and the mole ratio of OH— to Y is in the range of about 1:1 to about 25:1.

15. The method of claim 9 wherein said mixture is heated in an enclosed reactor under autogeneous pressure.

16. The method of claim 9 wherein said source of silicon is an oxide, hydroxide or alkoxide of silicon.

17. The method of claim 9 wherein said source of silicon is a silica gel, silicic acid, silica sol or silicate.

18. The method of claim 9 in which said source of silicon is a silica sol.

19. The method of claim 9 wherein said source of yttrium is an oxide, hydroxide or salt of yttrium.

20. The method of claim 9 wherein said source of yttrium is an inorganic salt of yttrium.

21. The method of claim 9 wherein said source of yttrium is an organic salt of yttrium.

22. The method of claim 9 wherein said source of yttrium is a nitrate, sulfate, halide, carbonate, silicate or of yttrium.

23. The method of claim 9 wherein said source of yttrium is an acetate, formate, butyrate, propionate or benzylate of yttrium.

24. The method of claim 9 wherein said source of yttrium is yttrium chloride, yttrium chloride hydrate or yttrium oxide.

25. The method of claim 9 wherein said source of alkali metal is oxide, hydroxide or salt of said alkali metal.

26. The method of claim 9 wherein said source of alkali metal is an inorganic salt of said alkali metal.

27. The method of claim 9 wherein said source of alkali metal is an organic salt of said alkali metal.

28. The method of claim 9 wherein said source of alkali metal is a nitrate, halide, sulfate, carbonate, silicate or of said alkali metal.

29. The method of claim 9 wherein said source of alkali metal is an acetate, formate, butyrate, propionate or benzylate of said alkali metal.

30. The method of claim 9 wherein said alkali metal is sodium.

31. The method of claim 30 wherein said source of sodium is sodium hydroxide.

32. The method of claim 9 wherein said temperature is in the range of about 100° C. to about 200° C.

33. The method of claim 9 wherein said period of time is in the range of from about 1 hour to about 30 days.

34. The method of claim 9 wherein said period of time is in the range of from about 6 hours to about 14 days.

35. A method of making an ion-exchanged yttrium silicate comprising:

mixing a yttrium silicate and an ammonium salt or a salt of a catalytically active metal in water to provide a mixture, said yttrium silicate comprising a complex represented in terms of mole ratios of oxides as follows:

$$aA_2O:Y_2O_3:bSiO_2:cH_2O$$

wherein A is an alkali metal; a is a number ranging from about 0.5 to about 20; b is a number ranging from about 2 to about 400; and c is a number ranging from about 1 to about 500; and maintaining said mixture at an effective temperature for an effective period of time to provide the desired ion-exchanged yttrium silicate.

36. The method of claim 35 with the step of heat treating said ion-exchanged yttrium silicate in an inert, oxidizing or reducing atmosphere.

37. The product of claim 35.

38. The product of claim 36.

* * * * *